F. MEYER.
CIGAR.
APPLICATION FILED AUG. 2, 1907.
931,629.
Patented Aug. 17, 1909.
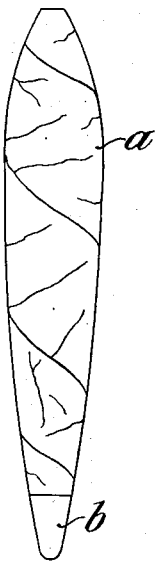
Witnesses.
F. P. Britt
C. E. Duffy
Inventor.
Felix Meyer
per
Atty's.

UNITED STATES PATENT OFFICE.

FELIX MEYER, OF AACHEN, GERMANY.

CIGAR.

No. 931,629.

Specification of Letters Patent.

Patented Aug. 17, 1909.

Application filed August 2, 1907. Serial No. 386,829.

*To all whom it may concern:*

Be it known that I, FELIX MEYER, merchant, German subject, residing at 10 Kurbrunnenstrasse, Aachen, Germany, have invented a new and useful Improvement in Cigars, of which the following is a specification.

My invention relates to a method of impregnating or coating the ends of cigars.

In the drawing *a* represents the body of a cigar, *b* the coating of acetyl-cellulose at the mouth end or tip of same.

It is well known that attempts have been heretofore made to impregnate the ends of cigars with solutions of cellulose in order to protect the lips of the smoker, but for this purpose nitro-cellulose has hitherto been used exclusively, and particularly that form of it known as collodion. Such coatings were easily inflammable and therefore presented a certain danger, both in the use of the cigars and in the preparation of them. Further, owing to the very slight solubility of the nitro-cellulose, it was necessary to dip the cigars repeatedly in order to insure a coating of sufficient strength and durability. But the great trouble was that the layer of collodion shriveled up and caused the outer leaf of the cigar, as well as the underlying layers, to tear, thus spoiling the appearance of the cigars, and reducing their value in another way, as they would not then draw well.

The essence of the present invention lies in the use of solutions of acetyl-cellulose, instead of nitro-cellulose, in treating the cigar ends, and more particularly of such acetyl-cellulose as is soluble in alcohol or acetone. By using strong solutions, a sufficiently strong coating can be put on the cigar end by dipping it once or by smearing it over. There is the further advantage that this treatment involves no danger of fire, and there is no risk of the coating igniting when the cigar is used; while, lastly, the procedure according to this invention, possesses the very great advantage over the use of nitro-cellulose solutions that any shriveling up of the coating, with the bad consequences above mentioned, is entirely avoided.

The coating can be colored by mixing any suitable coloring matter with the acetyl-cellulose.

Having thus described my invention, what I claim and desire to secure by Letters Patent is:

1. As an article of manufacture a cigar, the mouth end of which is impregnated or coated with a solution of acetyl-cellulose.

2. As an article of manufacture, a cigar, whose mouth end is impregnated with a solution of acetyl-cellulose mixed with a coloring matter.

In witness whereof I have hereunto signed my name at Aix-la-Chapelle, this 6th day of July 1907, in the presence of two subscribing witnesses.

FELIX MEYER.

Witnesses:
HENRY QUADFLUG,
ERNST BEITEL.